United States Patent
Kaphengst et al.

(10) Patent No.: US 9,434,058 B2
(45) Date of Patent: Sep. 6, 2016

(54) PASSENGER AIRBAG INSTALLATION VERIFICATION TOOL AND METHODS

(71) Applicant: GM Global Technology Operations LLC, Detroit, MI (US)

(72) Inventors: Michael R. Kaphengst, Leonard, MI (US); Robert J. Scheuerman, Washington, MI (US); Craig A. Rodriguez, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 13/957,788

(22) Filed: Aug. 2, 2013

(65) Prior Publication Data

US 2015/0033531 A1 Feb. 5, 2015

(51) Int. Cl.
| | |
|---|---|
| *B25B 27/00* | (2006.01) |
| *B23P 11/00* | (2006.01) |
| *B60R 21/205* | (2011.01) |
| *B60S 5/00* | (2006.01) |

(52) U.S. Cl.
CPC ............ *B25B 27/0035* (2013.01); *B23P 11/00* (2013.01); *B60R 21/205* (2013.01); *B60S 5/00* (2013.01); *Y10T 29/4978* (2015.01); *Y10T 29/53091* (2015.01); *Y10T 29/53909* (2015.01); *Y10T 29/53913* (2015.01)

(58) Field of Classification Search
CPC .. B25B 27/0035; B60R 21/205; B23P 11/00; B60S 5/00; Y10T 29/53913; Y10T 29/4978; Y10T 29/53909; Y10T 29/53091
See application file for complete search history.

(56) References Cited

U.S. PATENT DOCUMENTS

| 7,770,914 B2* | 8/2010 | Dumbrique ........... B60R 21/205 |
| | | 280/728.2 |
| 2005/0127642 A1 | 6/2005 | Weissert et al. |
| 2009/0033070 A1 | 2/2009 | Dumbrique |

FOREIGN PATENT DOCUMENTS

| CN | 1712280 A | 12/2005 |
| DE | 102008047676 A1 | 4/2010 |
| EP | 2163373 A2 | 3/2010 |
| JP | H0891161 A | 4/1996 |
| KR | 20020037203 A | 5/2002 |

OTHER PUBLICATIONS

Machine Translation of Krug, DE102008047676A1, Mar. 2010.*
German Office Action dated Apr. 17, 2015; Application No. 102014110697.0; Applicant: GM Global Technology Operations LLC ; 6 pages.
Chinese Office Action dated Feb. 3, 2016; Application No. 201410375595.9; Applicant:GM Global Technology Operations LLC.; 42 pages.

* cited by examiner

*Primary Examiner* — Ryan J Walters
(74) *Attorney, Agent, or Firm* — BrooksGroup (57) ABSTRACT

A number of variations may include a product including an installation device having a plurality of pillars which are constructed and arranged to accept a passenger airbag housing; wherein at least one sensor or switch is attached to the installation device which may physically engage at least one tab during the installation process and which may provide electronic feedback of the installation results. A number of variations may include a method including placing a passenger airbag assembly having at least one lock feature onto an instrument panel chute having at least one tab feature; placing the installation device having at least one sensor or switch attached to it onto the passenger airbag assembly; pressing down on the installation device to engage the at least one lock feature with the at least one tab feature; and wherein the at least one sensor or switch provides electronic feedback of the installation results.

5 Claims, 9 Drawing Sheets

PASSENGER AIRBAG INSTALLATION VERIFICATION TOOL AND METHODS

TECHNICAL FIELD

The field to which the disclosure generally relates to includes validating and installing a passenger airbag into an instrument panel chute.

BACKGROUND

Vehicles may be equipped with one or more airbags.

SUMMARY OF ILLUSTRATIVE VARIATIONS OF THE DISCLOSURE

One variation may include a product comprising: an installation device having a top plate; wherein the top plate includes a top surface and a bottom surface; wherein a plurality of pillars extend downward from the bottom surface of the top plate; wherein the plurality of pillars are constructed and arranged to accept a passenger airbag housing and an instrument panel chute; and wherein the installation device is constructed and arranged to engage at least one lock feature on the passenger airbag housing and at least one tab feature on the instrument panel chute.

Another variation may include a method comprising: placing a passenger airbag assembly having at least one lock feature onto an instrument panel chute having at least one tab feature; providing an installation device having a plurality of pillars which are constructed and arranged to engage a passenger airbag housing and an instrument panel chute and which include one or more switches or sensors; placing the installation device onto the passenger airbag housing and the instrument panel chute; pressing down on the installation device to engage the at least one lock feature with the at least one tab feature; and verifying the at least one tab feature and the at least one lock feature engagement through the use of the at least one switch or sensor which may be constructed and arranged to engage the instrument panel tab during installation.

Another variation may include a hand applied installation device which physically engages at least one tab and at least one lock feature, and which may include at least one sensor or switch which may physically engage the at least one tab feature which may detect processing errors and which may provide electronic feedback and in station error proofing.

Another variation may include a mechanically applied installation device which physically engages at least one tab and at least one lock feature, and which may include at least one sensor or switch which may physically engage the at least one tab which may detect processing errors and which may provide electronic feedback and in station error proofing.

Other illustrative variations will become apparent from the detailed description provided hereinafter. It should be understood that the detailed description and specific examples, while disclosing optional variations, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

One variation may include a product comprising: an installation device having a top plate; wherein the top plate includes a top surface and a bottom surface; wherein a plurality of pillars extend downward from the bottom surface of the top plate; and wherein the plurality of pillars are constructed and arranged to accept a passenger airbag housing and an instrument panel chute.

Another variation may include a method comprising: placing a passenger airbag assembly having at least one lock feature onto an instrument panel chute having at least one tab feature; providing an installation device having a plurality of pillars which are constructed and arranged to engage a passenger airbag housing and instrument panel chute and which may include one or more switches or sensors; pressing down on the installation device to engage the at least one lock feature with the at least one tab feature; and verifying the at least one tab feature and the at least one lock feature engagement through the use of the at least one switch or sensor which may be constructed and arranged to engage the instrument panel tab during installation.

Another variation may include a hand applied installation device which physically engages at least one tab and at least one lock feature, and which may include at least one sensor or switch which may physically engage the at least one tab which may detect processing errors and which may provide electronic feedback and in station error proofing.

Another variation may include a mechanically applied installation device which physically engages at least one tab and at least one lock feature, and which may include at least one sensor or switch which may physically engage the at least one tab which may detect processing errors and which may provide electronic feedback and in station error proofing.

Figure 1:
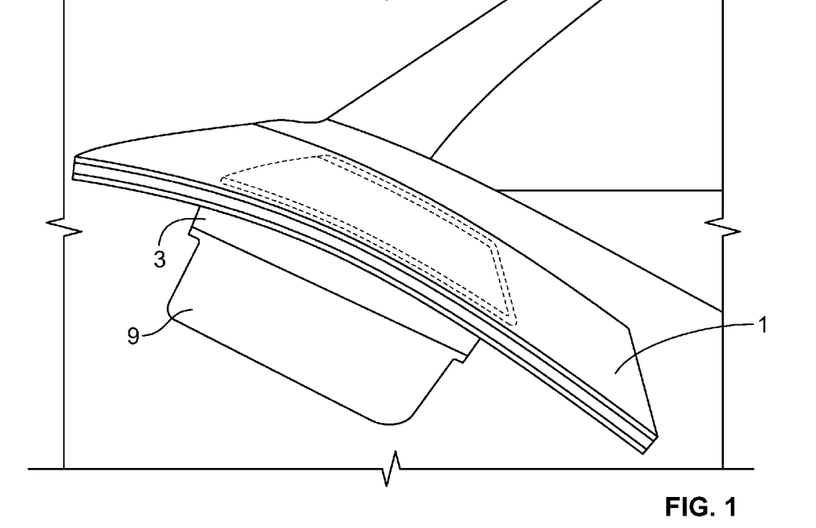
FIG. 1 is an overall view of an instrument panel including a passenger airbag assembly and instrument panel chute according to a number of variations.

An example of an instrument panel 1 having a passenger airbag assembly 9 attached to an instrument panel chute 3 is illustrated in FIG. 1. Any number of events may cause the passenger airbag assembly 9 to deploy through the instrument panel 1. The passenger airbag assembly 9 may need to be installed properly into the instrument panel chute 3 in order to deploy properly through the instrument panel 1. Proper installation may include proper attachment of the passenger airbag 9 to the instrument panel chute 3.

Figure 2:
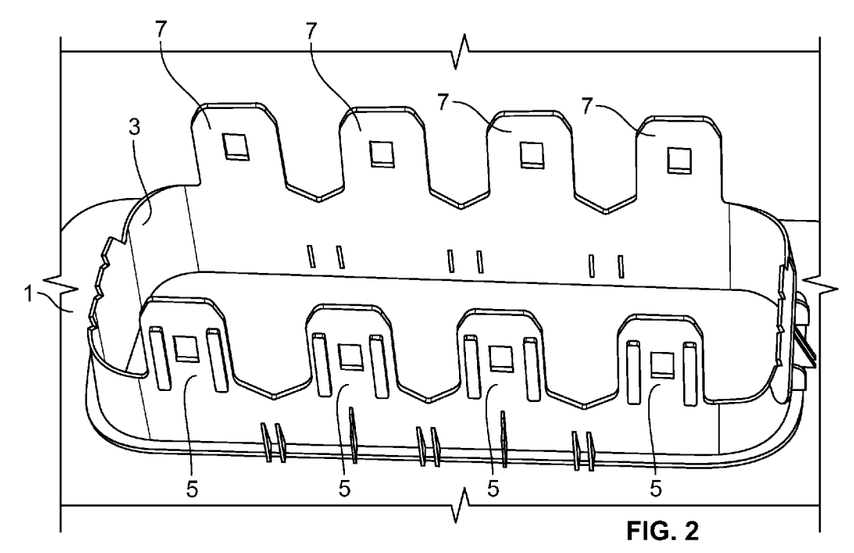
FIG. 2 is an overall view of an instrument panel chute according to a number of variations.
Figure 3:
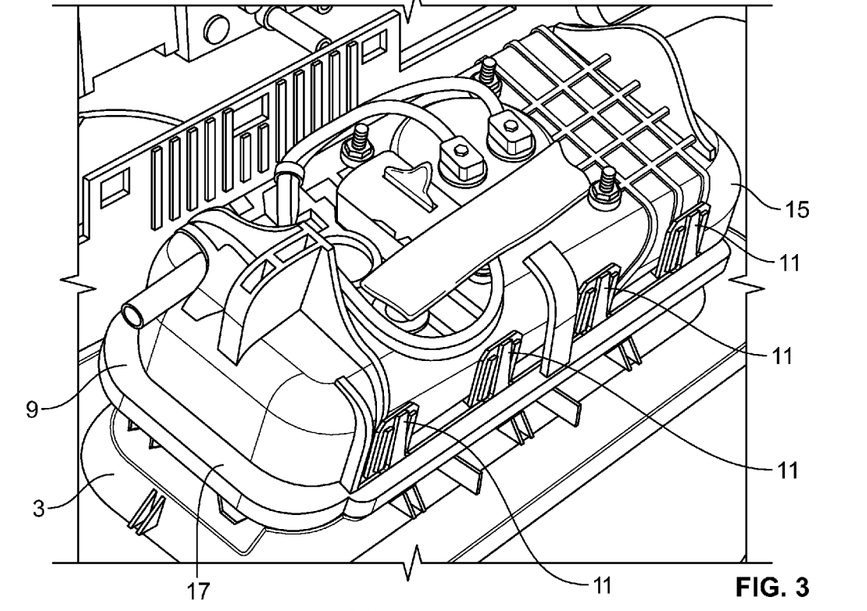
FIG. 3 is an overall view of a passenger airbag assembly according to a number of variations.
Figure 15:
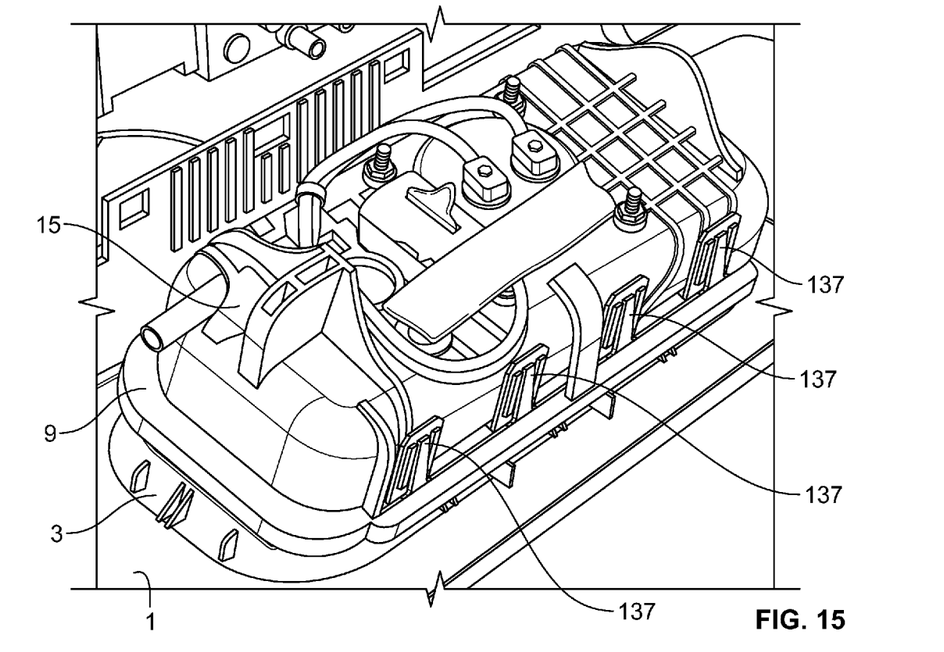
FIG. 15 depicts a passenger airbag assembled together with an instrument panel chute according to a number of variations.

Referring to FIGS. 2-3 and 15, in a number of variations, the instrument panel chute 3 may include one or more tab(s) 5,7. A mating passenger airbag assembly 9 may include one or more chute lock(s) 11, 13. The passenger airbag assembly 9 may be attached to the instrument panel chute 3 by engaging the instrument panel chute tabs 5, 7 with the passenger airbag assembly 9 chute locks 11, 13.

Referring to FIGS. 10-13, a passenger airbag assembly 9 may be assembled to the instrument panel chute 3 using an installation device 19. The installation device 19 may include several pillars 47, 49, 51, 53, 55, 57, 99, 101, 109, 111, 119, 121 and side supports 35, 37, 87, 89 attached to a top plate 21, 91, for example as illustrated in FIGS. 4-8.

Figure 4:
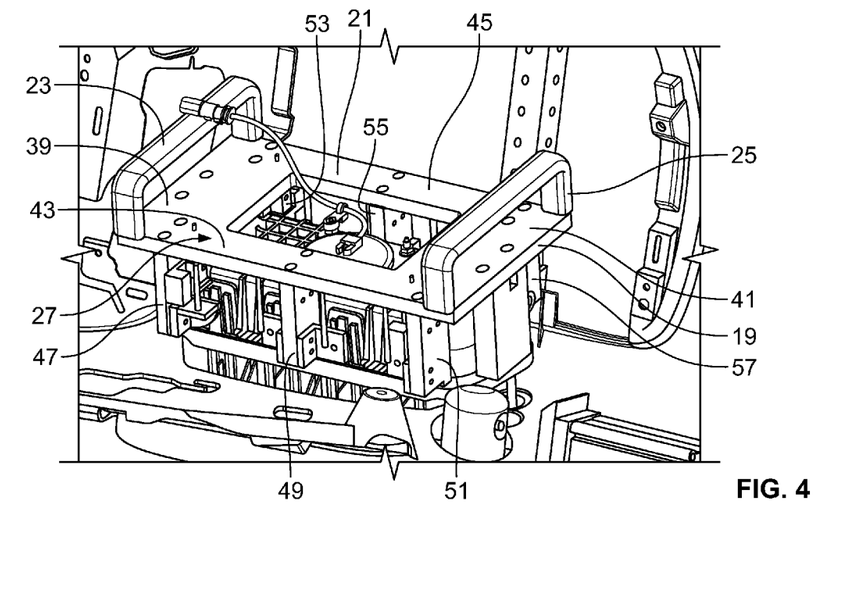
FIG. 4 is an overall view of an installation device according to a number of variations of the invention.
Figure 5:
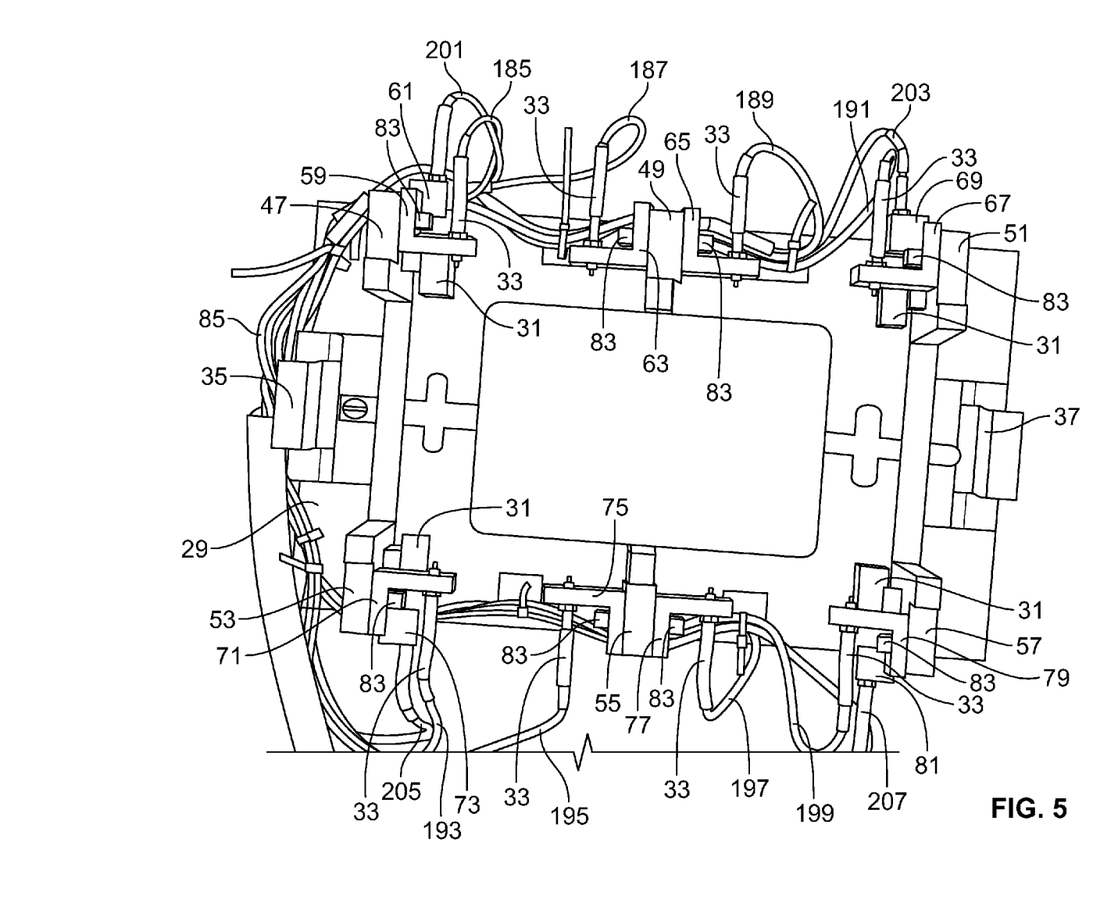
FIG. 5 is a bottom view of an installation device according to a number of variations of the invention.

Referring to FIGS. 4-5, in a number of variations, a first, second, and third forward pillar 47, 49, 51 may be attached to the forward edge 43 of the underside 29 of the top plate 21. A first forward pillar 47 may be attached to the left hand portion of the underside 29 of the forward edge 43 of the top plate 21. A second forward pillar 49 may be attached to the middle portion of the underside 29 of the forward edge 43 of the top plate 21. A third forward pillar 51 may be attached to the right hand portion of the underside 29 of the forward edge 43 of the top plate. A first, second, and third rearward pillar may be attached to the underside 29 of the rearward edge 45 of the top plate 21. A first rearward pillar 53 may be attached to the left hand portion of the underside 29 of the rearward edge 45 of the top plate 21. A second rearward pillar 55 may be attached to the middle portion of the underside 29 of the rearward edge 45 of the top plate 21. A third rearward pillar 57 may be attached to the right hand portion of the underside 29 of the rearward edge 45 of the top plate 21. The pillars 47, 49, 51, 53, 55, 57 may be configured in any of a number of variations to make contact with the passenger airbag housing 15 and the passenger airbag housing lip 17. The installation device 19 may also include a first side support 35 attached to the left hand edge 39 of the underside 29 of the top plate 21 and a second side support 37 attached to the right hand edge 41 of the underside 29 of the top plate 21. The side supports 35, 37 may be configured in any of a number of variations to contact the passenger airbag housing lip 17.

Figure 6:
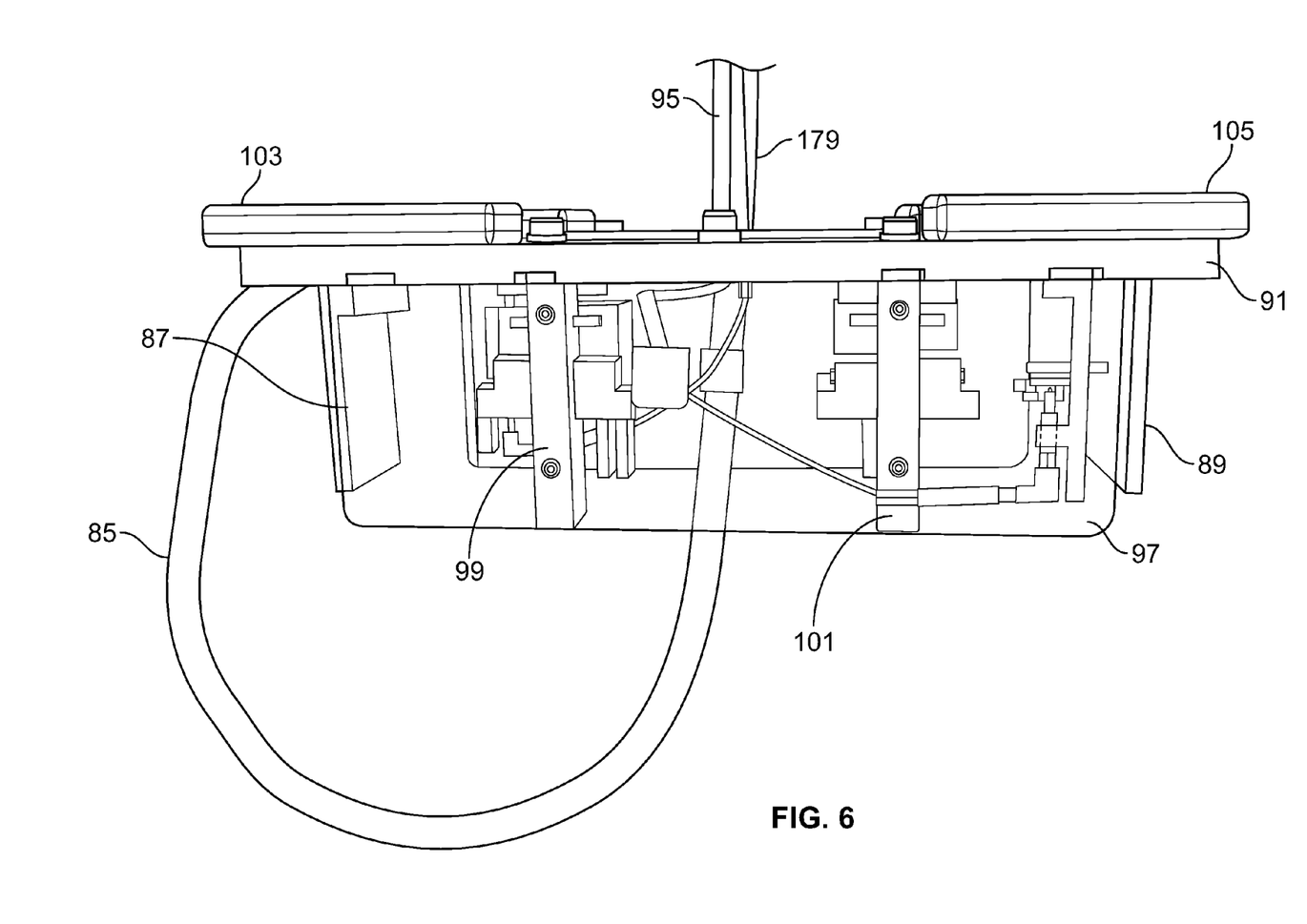
FIG. 6 is a side view of an installation device according to a number of variations of the invention.
Figure 7:
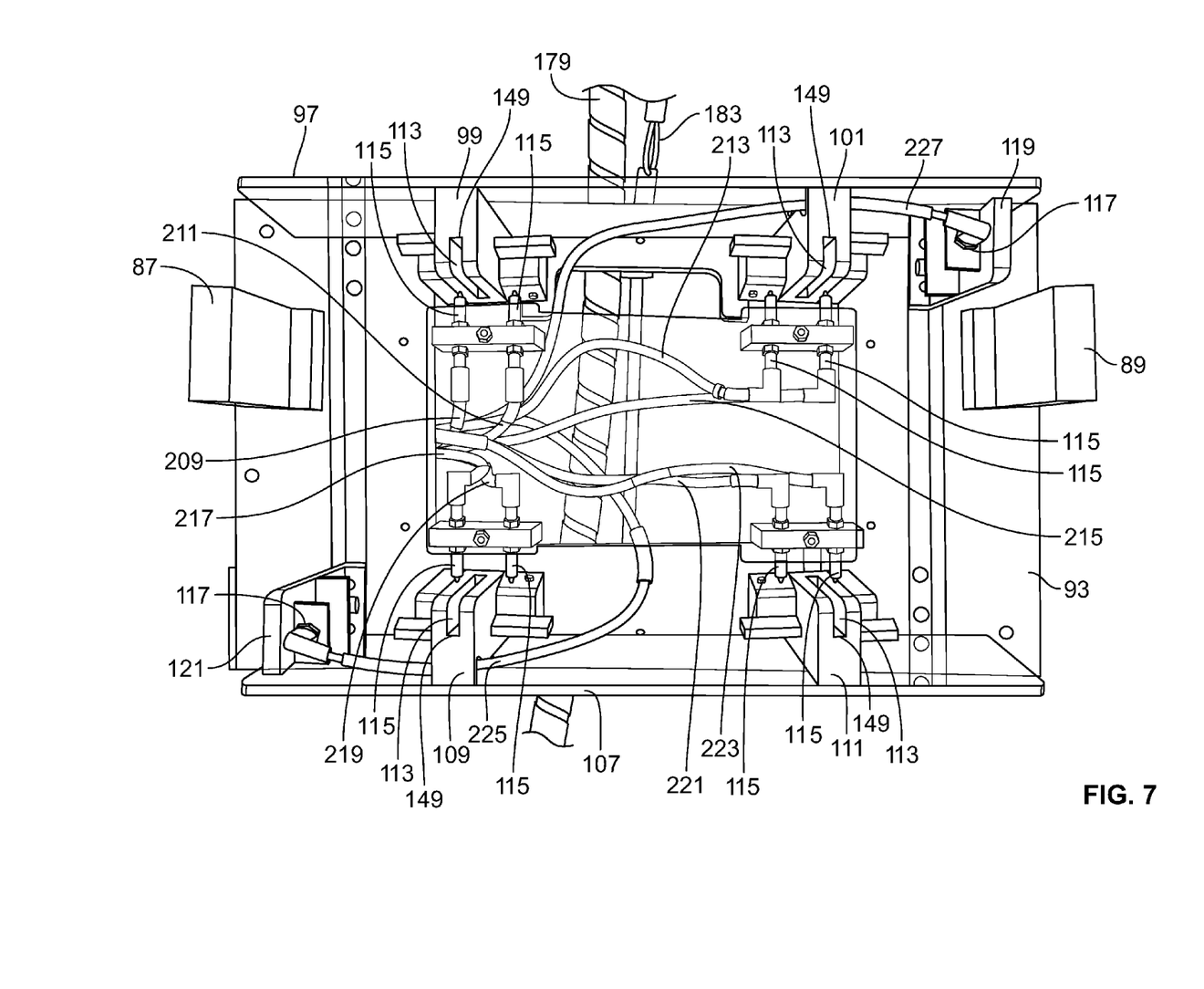
FIG. 7 is a bottom view of an installation device according to a number of variations of the invention.
Figure 8:
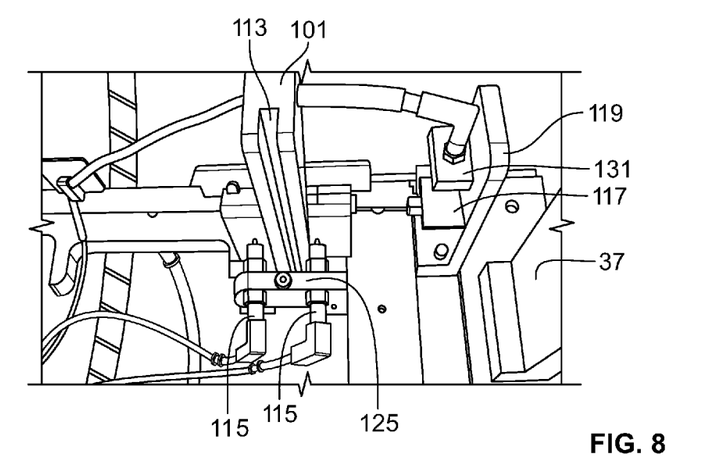
FIG. 8 is a close up of various switch assemblies according to a number of variations of the invention.

Referring to FIGS. 6-8, in a number of variations, a first and second forward pillar 99,101 may be attached to the forward edge 141 of the underside 93 of the top plate 91. A first and second rearward pillar 109,111 may be attached to the rearward edge 143 of the underside 93 of the top plate 91. A first corner pillar 119 may be attached to the right hand corner of the underside 93 of the forward edge 141 of the top plate 91. A second corner pillar 121 may be attached to the left hand corner of the underside 93 of the rearward edge 143 of the top plate 91. A first side support 87 may be connected to the left hand edge 147 of the underside 93 of the top plate 91. A second side support 89 may be connected to the right hand edge 145 of the underside 93 of the top plate 91. A forward plate 97 may be attached to the first and second forward pillars 99, 101. A rearward plate 107 may be attached to the first and second rearward pillars 109,111. The forward and rearward plates 97, 107 may be constructed out of a variety of materials, including, but not limited to, a transparent thermoplastic.

Referring to FIGS. 7-8, in a number of variations, one or more pillars 47, 49, 51, 53, 55, 57, 99, 101, 109, 111 may have a slot 149 along their length which may act as an alignment feature 113 which may mate with the passenger airbag housing 15. The alignment feature 113 may prevent the installation device 19 from being placed onto the passenger airbag assembly housing 15 incorrectly.

Referring to FIG. 6, in a number of variations, the installation device 19 may include a first handle 23 attached to the left hand side of the top surface 27 of the top plate 21 and second handle 25 which may be connected to the right hand side of the top surface 27 of the top plate 21.

Referring to FIG. 6, in a number of variations, the installation device 19 may also include one or more top plate covers 103, 105 which may be attached to the top surface 181 of the top plate 91 and which may be configured in any of a number of variations which may increase the ergonomics of the installation device 19.

The installation device 19 may also have a rod 95 extending from the top surface 181 of the top plate 91. The bottom portion of the rod 95 may be attached to a top plate 91 in any of a number of variations including, but not limited to a mechanical fastener. The top portion of the rod 95 may be attached to a hooking feature 183. The hooking feature 183 may then be attached to a retractable cable 179 which may be connected to an operator station in any of a number of variations.

Figure 9:
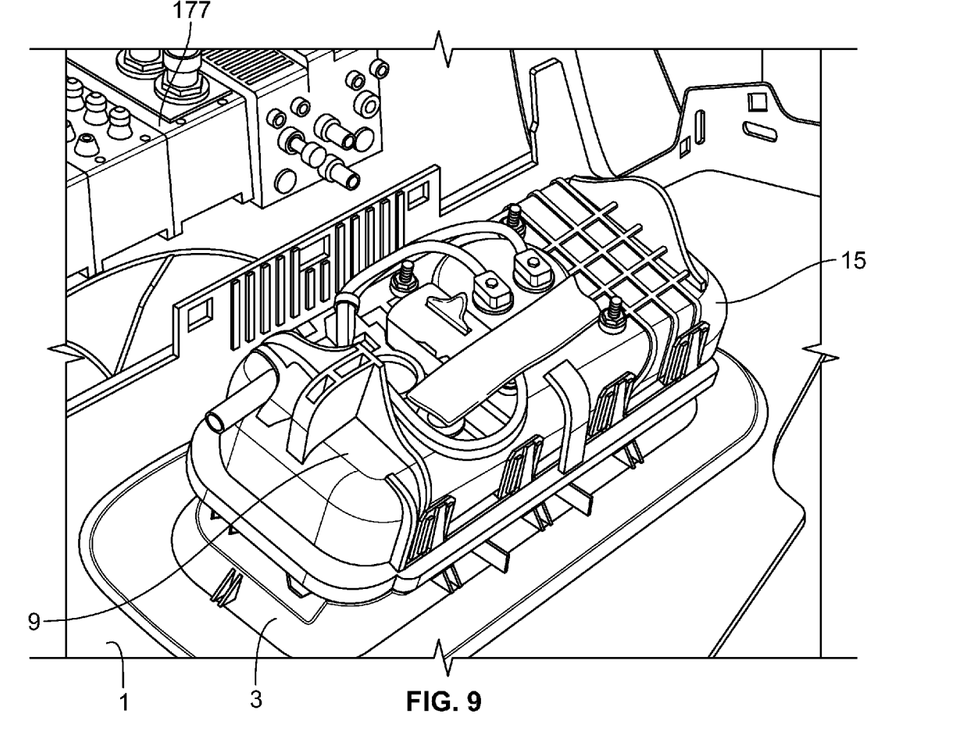
FIG. 9 depicts the passenger airbag placed onto the instrument panel chute according to a number of variations of the invention.
Figure 10:
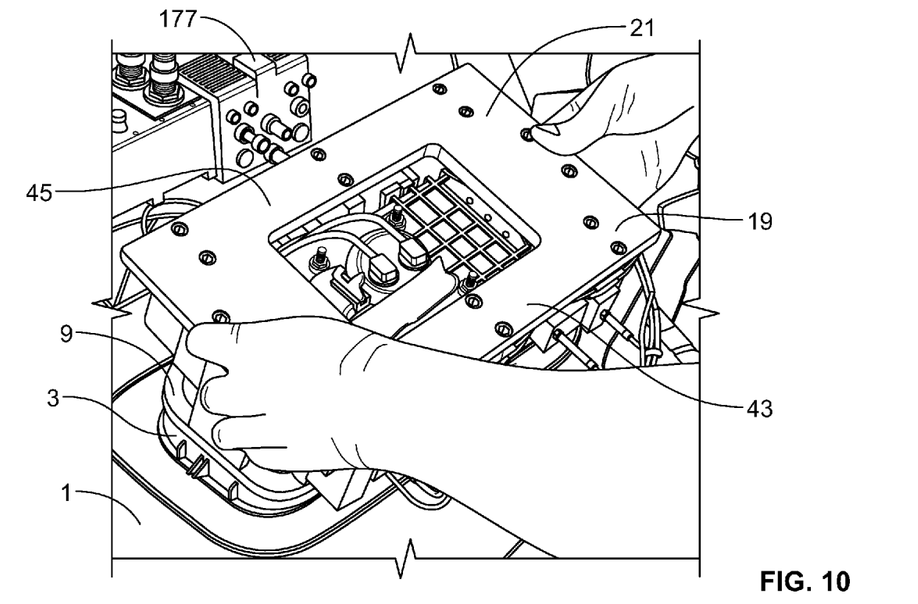
FIG. 10 depicts an installation device placed onto the passenger airbag assembly and instrument panel chute according to a number of variations of the invention.

Referring to FIGS. 9-10, in a number of variations, the passenger airbag assembly 9 may be placed onto the instrument panel chute 3 with the top surface 151 of the passenger airbag assembly 9 being placed down into the instrument panel chute 3. The installation device 19 may then be placed over the passenger airbag housing 15.

Figure 11:
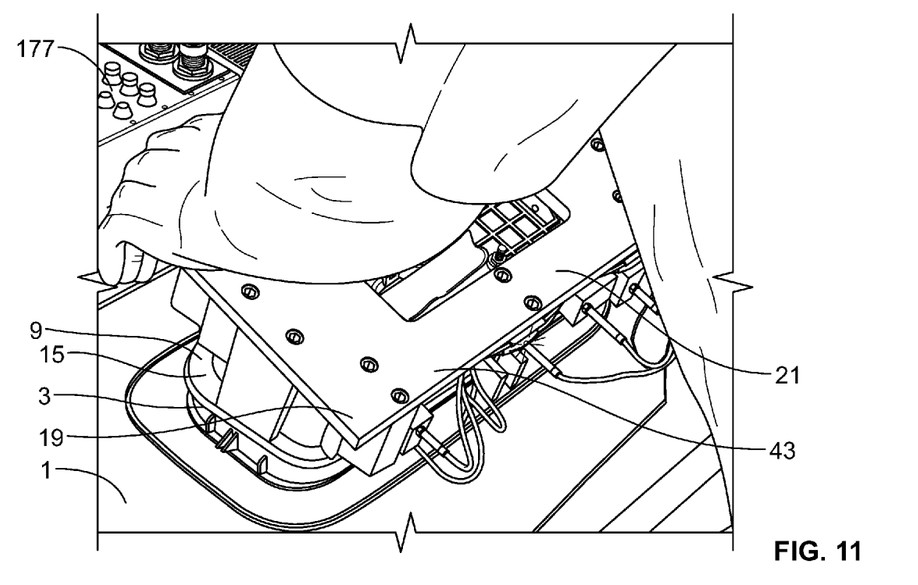
FIG. 11 depicts an installation method according to a number of variations of the invention.
Figure 12:
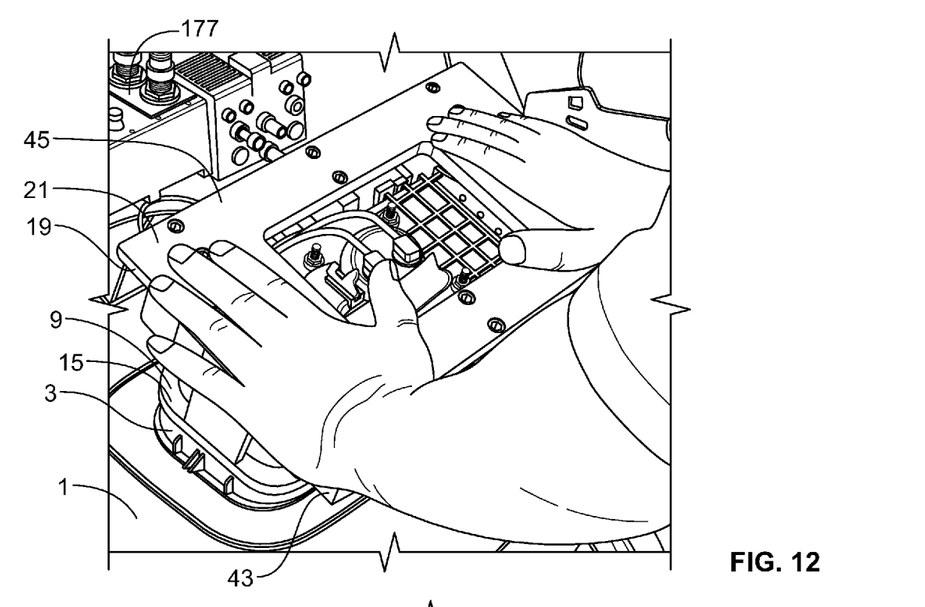
FIG. 12 depicts an installation method according to a number of variations of the invention.

In a number of variations, the operator may push down on the installation device 19 to engage the instrument panel chute tabs 5, 7 and the passenger airbag assembly chute locks 11, 13. Referring to FIGS. 11-12, in a number of variations, the operator may push down on the rearward edge 45 of the top plate 21, causing the first, second, and third rearward pillars 53, 55, 57 and the side supports 35, 37 to push the passenger airbag chute locks 11, 13 into the instrument panel chute tabs 5, 7 causing them to engage 137. An operator may next push down on the forward edge 43 of the top plate 21, causing the first, second, and third forward pillars 47, 49, 51 and the side supports 35, 37 to push the passenger airbag chute locks 11, 13 into the instrument panel chute tabs 5, 7 causing them to engage 137.

Referring to FIGS. 4-8 and 10-14 an installation device 19, in a number of variations, may also include one or more switch assemblies 31, 33, 115, 117 or sensors (not shown). The one or more switch assemblies 31, 33, 115, 117 or sensor(s) may be assembled to the installation device 19, for example as illustrated in FIGS. 5-8.

Referring to FIG. 5, a first forward bracket 59 may be attached to the first forward pillar 47 in any of a number of variations, and may be configured in any of a number of variations to accommodate a switch assembly 33. A second forward pillar bracket 63 may be attached to the left hand side of the second forward pillar 49 in any of a number of variations and may be configured in any of a number of variations to accommodate a switch assembly 33. A third forward pillar bracket 65 may be attached to the right hand side of the second forward pillar 49, in any of a number of variations, and may be configured in any of a number of variations to accommodate a switch assembly 33. A fourth forward pillar bracket 67 may be attached to a third forward pillar 51 in any of a number of variations, and may be configured in any of a number of variations to accommodate a switch assembly 33. A first rearward pillar bracket 71 may be attached to the first rearward pillar 53 in any of a number of variations, and may be configured in any of a number of variations to accommodate a switch assembly 33. A second rearward pillar bracket 75 may be attached to the left hand side of the second rearward pillar 55 in any of a number of variations, and may be configured in any of a number of variations to accommodate a switch assembly 33. A third rearward pillar bracket 77 may be attached to the right hand side of the second rearward pillar 55 in any of a number of variations, and may be configured in any of a number of variations to accommodate a switch assembly 33. A fourth rearward pillar bracket 79 may be attached to the third rearward pillar 57 in any of a number of variations, and may be configured in any of a number of variations to accommodate a switch assembly 33. A fifth forward pillar bracket 69 may be attached to the first forward pillar 47 in any of a number of variations and may be configured in any of a number of variations to accommodate a switch assembly 31. A sixth forward pillar bracket 61 may be attached to the third forward pillar 51 in any of a number of variations and may be configured in any of a number of variations to accommodate a switch assembly 31. A fifth rearward bracket 81 may be attached to the first rearward pillar 53 in any of a number of variations and may be configured in any of a number of variations to accommodate a switch assembly 31. A sixth rearward pillar bracket 73 may be attached to the third rearward pillar 57 in any of a number of variations and may be configured in any of a number of variations to accommodate a switch assembly 31.

Referring to FIG. 7, a first forward pillar bracket 123 may be attached to a first forward pillar 99 in any of a number of variations and may be configured in any of a number of variations to accommodate one or more switch assemblies 115. A second forward pillar bracket 125 may be attached to a second forward pillar 101 in any of a number of variations and may be configured in any of a number of variations to accommodate one or more switch assemblies 115. A first rearward pillar bracket 127 may be attached to a first rearward pillar 109 in any of a number of variations and may be configured in any of a number of variations to accommodate one or more switch assemblies 115. A second rearward pillar bracket 129 may be attached to a second rearward pillar 111 in any of a number of variations and may be configured in any of a number of variations to accommodate one or more switch assemblies 115. A first corner bracket 131 may be attached to a first corner pillar 119 in any of a number of variations and may be configured in any of a number of variations to accommodate a switch assembly 117. A second corner bracket 133 may be attached to a second corner pillar 121 in any of a number of variations and may be configured to accommodate a switch assembly 117.

Referring to FIGS. 5-8, the brackets 59, 61, 63, 65, 67, 69, 71, 73, 75, 77, 79, 81, 123, 125, 127, 129, 131, 133 may be attached to the pillars 47, 49, 51, 53, 55, 57, 99, 101, 109, 111, 119, 121 in any of a number of variations, including but not limited to the use of one or more mechanical fastener(s) 83.

Any of a number of variations of switch assemblies 33, 31, 115, 117 or sensors may be used according to this invention. Referring to FIGS. 5-7, in a number of variations, a push style switch assembly 33, 115 may be used to validate that the passenger airbag assembly 9 is properly assembled with the instrument panel chute 3. A push style switch assembly 33, 115 may include a body 153 which includes a head 155. The head 155 may contain an actuator 157 which is mechanically connected to a set of contacts. When an object comes into contact with the actuator 157, the switch assembly 33, 115 operates the contacts to open or close the electrical connection 185, 187, 189, 191, 193, 195, 197, 199, 209, 211, 213, 215, 217, 219, 221, 223.

Figure 13:
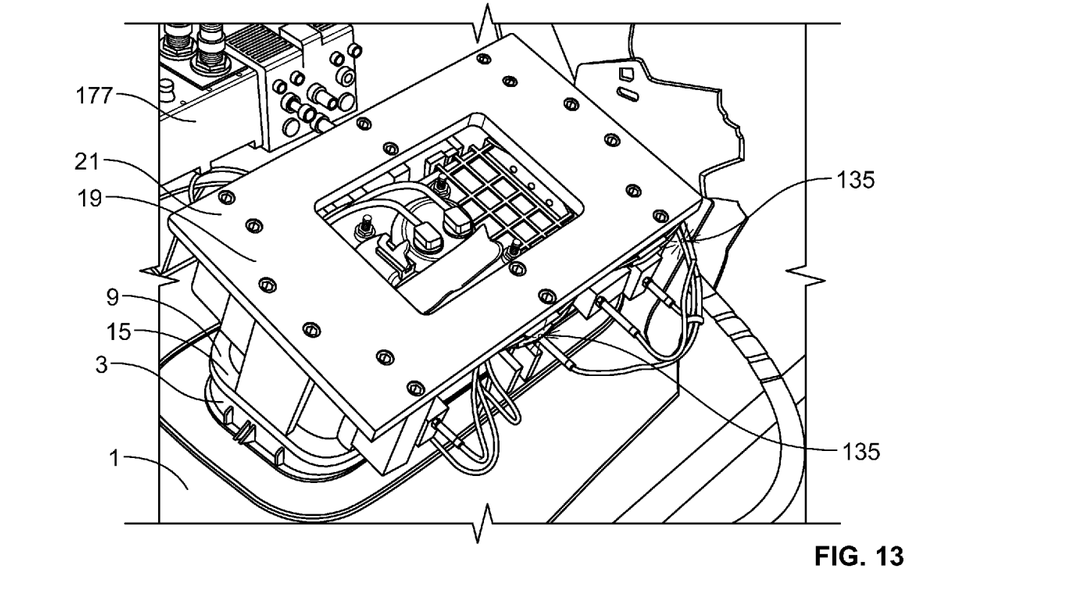
FIG. 13 depicts electronic feedback from the installation device according to a number of variations of the invention.
Figure 14:
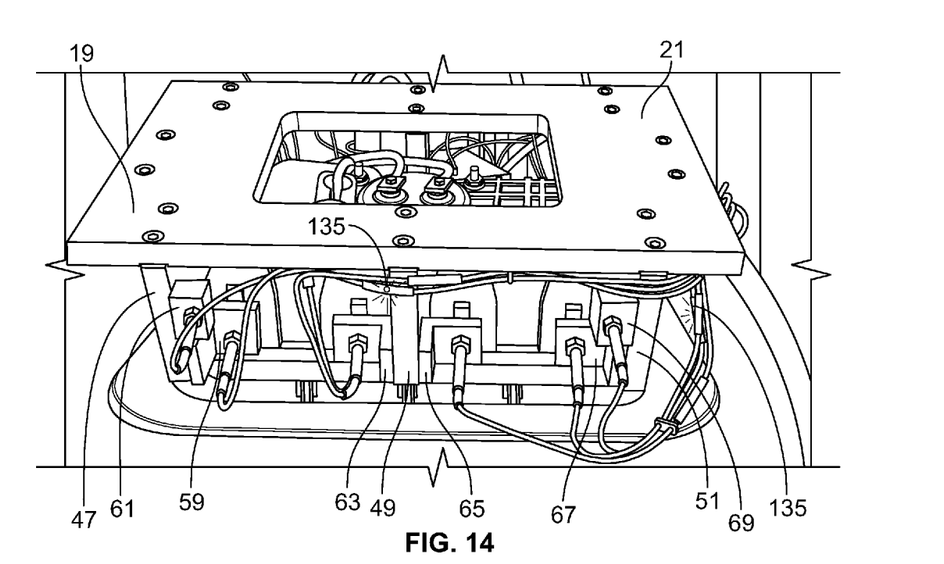
FIG. 14 depicts electronic feedback from the installation device according to a number of variations of the invention.

Referring to FIGS. 13-14, the switch assembly 33, 115 may be connected to a light source 135. The switch assembly 33, 115 may be placed into each location which may contact the engagement area of the instrument panel tabs 5, 7 and the passenger airbag chute locks 11, 13.

The switch assembly 33, 115 positioned to validate the engagement area of the instrument panel tabs 5, 7 and passenger airbag chute locks 11, 13 may be connected to a light source 135 which may create an open state electrical circuit 185, 187, 189, 191, 193, 195, 197, 199, 209, 211, 213, 215, 217, 219, 221, 223. When the operator pushes down onto the installation device 19, the instrument panel chute tabs 5, 7 may cause the passenger airbag chute locks 11, 13 to push outwardly which may cause the passenger airbag chute locks to make contact with the actuator 157 pushing the actuator 157 into the head 155 of the switch assembly 33, 115. This may cause the electrical circuit 185, 187, 189, 191, 193, 195, 197, 199, 209, 211, 213, 215, 217, 219, 221, 223 to close which may cause the light source 135 to turn on. As the operator continues to push down on the top plate 21, the instrument panel tabs 5, 7 may engage with the passenger airbag chute locks 11, 13. This may release the contact between the passenger airbag chute lock 11, 13 and the actuator 157, which may re-open the electrical circuit 185, 187, 189, 191, 193, 195, 197, 199, 209, 211, 213, 215, 217, 219, 221, 223. The electrical circuit 185, 187, 189, 191, 193, 195, 197, 199, 209, 211, 213, 215, 217, 219, 221, 223 may send electronic feedback to an electrical panel 177 which may record the results of whether or not the instrument panel tabs 5, 7 are properly engaged with the passenger airbag assembly 9 chute locks 11, 13.

Referring again to FIGS. 5-7, in a number of variations, one or more additional switch assemblies 31, 117 may be used to verify the height of the passenger airbag assembly 9 to the instrument panel chute 3.

Referring to FIG. 5, in any number of variations, a lever type switch assembly 31 may be located on the fifth and sixth forward brackets 61, 69 and fifth and sixth rearward pillar brackets 73, 81 to verify the height of the airbag assembly 9 to the instrument panel chute 3 which may reduce the risk of a false reading due to improper installation. Referring to FIGS. 7 and 8, in a number of variations, a lever type switch assembly 77 may be located on the first corner bracket 131 and on the second corner bracket 133 to verify the height of the airbag assembly 9 to the instrument panel chute 3 which may reduce the risk of a false reading due to improper installation.

Referring to FIGS. 5 and 7-8, in a number of variations, a lever style switch assembly 31, 117 may be used to verify the height of the airbag assembly 9 to the instrument panel chute 3. The lever style switch assembly 31, 117 may be connected to a light source 135 which may create an open state electrical circuit 201, 203, 205, 207, 225, 227. A lever component 159, 169 may be positioned under a push style switch 161. When the passenger airbag assembly 9 is a correct height from the instrument panel chute 3, the passenger airbag assembly 9 may push the lever component 159, 169 up toward the underside 29 of the top plate 21, 91. As the lever component 159, 169 is pushed up, the lever component 159, 169 may contact an actuator 167 on a push style switch assembly 161 and may push the actuator 167 into the head 165 of the switch assembly 31, 117 which may cause the circuit 201, 203, 205, 207, 225, 227 to close. This may cause a light source 135 to turn on. The electrical circuit(s) 201, 203, 205, 207, 225, 227 may send electronic feedback to an electrical panel 177 which may record the results of whether or not the passenger airbag assembly 9 height is proper.

Referring to FIGS. 5-8 and 11-14, in a number of variations, a light source 171 may be attached to an operator station which may be connected to the switch assembly electrical circuits 185, 187, 189, 191, 193, 195, 197, 199, 201, 203, 205, 207, 209, 211, 213, 215, 217, 219, 221, 223, 225, 227. If all of the instrument panel chute tabs 5, 7 and passenger airbag chute locks 11, 13 are engaged, and the passenger airbag assembly 9 is the correct height to the instrument panel chute 3, the light source 171 may glow a green color. If any of the instrument panel chute tabs 5, 7 and passenger airbag chute locks 11, 13 are not engaged, or the height of the passenger airbag assembly 9 is not the correct height to the instrument panel chute 3, then the light source 171 may glow a red color. This may give the operator visual feedback of whether the passenger airbag assembly 9 is properly installed into the instrument panel chute 3.

Further, an operator station may include one or more mechanical clamps (not shown) which hold the instrument panel 1 in place during assembly of the passenger airbag assembly 9 into the instrument panel chute 3. The one or more clamp(s) may be electrically connected to the electrical circuits 185, 187, 189, 191, 193, 195, 197, 199, 201, 203, 205, 207, 209, 211, 213, 215, 217, 219, 221, 223, 225, 227 used on the installation device 19. The clamps may receive a signal from the electrical circuits 185, 187, 189, 191, 193, 195, 197, 199, 201, 203, 205, 207, 209, 211, 213, 215, 217, 219, 221, 223, 225, 227 indicating whether the passenger airbag assembly 9 is properly assembled into the instrument panel chute 3. If the passenger airbag assembly 9 is properly installed into the instrument panel chute 3, the electrical circuits 185, 187, 189, 191, 193, 195, 197, 199, 201, 203, 205, 207, 209, 211, 213, 215, 217, 219, 221, 223, 225, 227 may send a signal to the clamps to release the instrument panel 1 from the station. If the passenger airbag assembly 9 is not properly installed into the instrument panel chute 3, then the clamps will remain closed. If the clamps remain closed, a key may be required to release the clamps. This may help to ensure that an improperly installed passenger airbag assembly 9 does not get past the station.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an installation device having a top plate; wherein the top plate includes a top surface and a bottom surface; wherein a plurality of pillars extend downward from the bottom surface of the top plate; wherein the plurality of pillars are constructed and arranged to accept a passenger airbag housing and an instrument panel chute; and wherein the installation device is constructed and arranged to engage a lock feature on the passenger airbag housing and a tab feature on the instrument panel chute.

Variation 2 may include a product as set forth in Variation 1 further comprising a first side support and a second side support attached to the top plate.

Variation 3 may include a product as set forth in any of Variations 1-2 further comprising a first corner pillar and a second corner pillar.

Variation 4 may include a product as set forth in any of Variations 1-3 wherein the plurality of pillars have an alignment feature.

Variation 5 may include a product as set forth in Variation 4 wherein the alignment feature is a slot located along the length of a pillar.

Variation 6 may include a product as set forth in any of Variations 1-5 further comprising a forward plate and a rearward plate.

Variation 7 may include a product as set forth in Variation 6 wherein the forward plate and the rearward plate comprise a transparent thermoplastic.

Variation 8 may include a product as set forth in any of Variations 1-7 further comprising a first handle and a second handle attached to the top plate.

Variation 9 may include a product as set forth in any of Variations 1-8 further comprising at least one top plate cover attached to the top plate.

Variation 10 may include a product as set forth in Variations 1-9 further comprising a rod having a top portion and a bottom portion attached to the top surface of the top plate.

Variation 11 may include a product as set forth in Variation 10 further comprising a hook attached to the top portion of the rod.

Variation 12 may include a product as set forth in Variation 11 further comprising a retractable cable attached to the hook.

Variation 13 may include a product as set forth in any of Variations 1-11 further comprising at least one switch attached to the installation device.

Variation 14 may include a product as set forth in Variation 13 wherein the at least one switch is attached to the plurality of pillars attached to the installation device.

Variation 15 may include a product as set forth in Variation 14 wherein the at least one switch is a push style switch.

Variation 16 may include a product as set forth in Variations 14-15 wherein the at least one switch is a lever style switch.

Variation 17 may include a product as set forth in any of Variations 14-16 wherein the at least one switch is electrically connected to a first light source.

Variation 18 may include a product as set forth in any of Variations 14-17 wherein the at least one switch and the first light source are electrically connected to an electrical panel.

Variation 19 may include a product as set forth in Variation 18 wherein the electrical panel is attached to a second light source.

Variation 20 may include a product as set forth in any of Variations 14-19 further comprising a mechanical clamp electrically connected to the electrical panel.

Variation 21 may include a product as set forth in any of Variations 1-20 further comprising at least one sensor attached to the installation device.

Variation 22 may include a product as set forth in Variation 21 wherein the at least one sensor is attached to at least one of the plurality of pillars attached to the installation device.

Variation 23 may include a product as set forth in any of Variations 21-22 further comprising a first light source electrically connected to the at least one sensor.

Variation 24 may include a product as set forth in Variation 23 further comprising an electrical panel electrically connected to the at least one sensor and the first light source.

Variation 25 may include a product as set forth in Variation 24 wherein the electrical panel is attached to a second light source.

Variation 26 may include a product as set forth in Variation 25 further comprising a mechanical clamp electrically connected to the electrical panel.

Variation 27 may include a method comprising: placing a passenger airbag assembly having at least one lock feature onto an instrument panel chute having at least one tab feature; providing an installation device having a plurality of pillars which are constructed and arranged to engage a passenger airbag housing and an instrument panel chute and which include at least one switch; placing the installation device onto the passenger airbag housing and instrument panel chute; pressing down on the installation device to engage the at least one lock feature with the at least one tab feature; and verifying the at least one tab feature and the at least one lock feature engagement through the use of the at least one switch which may be constructed and arranged to engage the instrument panel tab during installation.

Variation 28 may include a method comprising: placing a passenger airbag assembly having at least one lock feature onto an instrument panel chute having at least one tab feature; providing an installation device having a plurality of pillars which are constructed and arranged to engage a passenger airbag housing and an instrument panel chute and which include at least one sensor; placing the installation device onto the passenger airbag housing and instrument panel chute; pressing down on the installation device to engage the at least one lock feature with the at least one tab feature; and verifying the at least one tab feature and the at least one lock feature engagement through the use of the at least one sensor which may be constructed and arranged to engage the instrument panel tab during installation.

Variation 29 may include a method as set forth in any of Variations 27-28 further comprising verifying a height of the passenger airbag assembly to the instrument panel chute through the use of at least one switch.

Variation 30 may include a method as set forth in any of Variations 27-29 further comprising verifying a height of the passenger airbag assembly to the instrument panel chute through the use of at least one sensor.

Variation 31 may include a method as set forth in any of Variations 27-30 wherein the mechanical clamp is electrically connected to the at least one switch; and wherein the mechanical clamp remains locked if the at least one tab feature and the at least one lock feature are not engaged.

Variation 32 may include a method as set forth in any of Variations 27-31 wherein the mechanical clamp is electrically connected to the at least one sensor; and wherein the mechanical clamp remains locked if the at least one tab feature and the at least one lock feature are not engaged.

Variation 33 may include a method as set forth in any of Variations 27-32 wherein the mechanical clamp is electrically connected to the at least one switch; and wherein the mechanical clamp remains locked if the height of the passenger airbag assembly to the instrument panel chute is not proper.

Variation 34 may include a method as set forth in any of Variations 27-33 wherein the mechanical clamp is electrically connected to the at least one sensor; and wherein the mechanical clamp remains locked if the height of the passenger airbag assembly to the instrument panel chute is not proper.

Variation 35 may include a method as set forth in any of Variations 27-34 wherein the at least one switch is electrically connected to a first light source which provides visual feedback of whether the passenger airbag assembly is properly installed into the instrument panel chute.

Variation 36 may include a method as set forth in any of Variations 27-35 wherein the at least one sensor is electrically connected to a first light source which provides visual feedback of whether the passenger airbag assembly is properly installed into the instrument panel chute.

Variation 37 may include a method as set forth in any of Variations 27-36 wherein the at least one switch is electrically connected to an electrical panel to provide electrical feedback of the installation results.

Variation 38 may include a method as set forth in any of Variations 27-37 wherein the at least one sensor is electrically connected to an electrical panel to provide electrical feedback of the installation results.

Variation 39 may include a method as set forth in any of Variations 27-38 wherein the electrical panel is electrically connected to a second light source which provides visual feedback of whether the installation is proper.

Variation 40 may include a method as set forth in any of Variations 27-39 wherein the electrical panel is electrically connected to a second light source which provides visual feedback of whether the installation is proper.

The above description of select examples of the invention is merely exemplary in nature and, thus, variations or variants thereof are not to be regarded as a departure from the spirit and scope of the invention.

What is claimed is:
1. A product comprising:
an installation device having a top plate;
an airbag housing;
an instrument panel chute;
at least one switch attached to the installation device;
wherein the top plate includes a top surface and a bottom surface;
wherein a plurality of pillars extend downward from the bottom surface of the top plate;
wherein the plurality of pillars are constructed and arranged to accept the airbag housing and the instrument panel chute;
wherein the installation device is constructed and arranged to engage a lock feature on the airbag housing and a tab feature on the instrument panel chute
wherein the at least one switch is constructed and arranged to engage the tab feature on the instrument panel chute;

wherein the at least one switch is electrically connected to a first light source;
wherein the at least one switch and the first light source are electrically connected to an electrical panel; and
wherein the electrical panel is attached to a second light source.

2. The product of claim 1 wherein at least one of the plurality of pillars includes an alignment feature.

3. The product of claim 1 further comprising a forward plate and a rearward plate attached to the bottom surface of the top plate and wherein at least one top plate cover is attached to the top surface of the top plate.

4. The product of claim 1 further comprising a first handle and a second handle attached to the top surface of the top plate.

5. A product comprising:
an installation device having a top plate;
an airbag housing;
an instrument panel chute;
at least one sensor attached to the installation device;
wherein the top plate includes a top surface and a bottom surface;
wherein a plurality of pillars extend downward from the bottom surface of the top plate;
wherein the plurality of pillars are constructed and arranged to accept the airbag housing and the instrument panel chute;
wherein the installation device is constructed and arranged to engage a lock feature on the airbag housing and a tab feature on the instrument panel chute;
wherein the at least one sensor is constructed and arranged to contact the tab feature on the instrument panel chute; wherein the at least one sensor is electrically connected to a first light source; wherein the at least one sensor and the first light source are electrically connected to an electrical panel; and
wherein the electrical panel is attached to a second light source.

* * * * *